Jan. 27, 1970  R. B. WELSH  3,492,560
THREE-PHASE FULL WAVE RECTIFIER FOR A THREE-PHASE
FOUR-WIRE ALTERNATING CURRENT SUPPLY
Filed Dec. 26, 1967  2 Sheets-Sheet 1

INVENTOR
ROBERT B. WELSH

BY  Alfred E Hall

ATTORNEY

United States Patent Office

3,492,560
Patented Jan. 27, 1970

3,492,560
THREE-PHASE FULL WAVE RECTIFIER FOR A THREE-PHASE FOUR-WIRE ALTERNATING CURRENT SUPPLY
Robert B. Welsh, Minneapolis, Minn., assignor to Sperry Rand Corporation, New York, N.Y., a corporation of Delaware
Filed Dec. 26, 1967, Ser. No. 693,658
Int. Cl. H02m 7/30
U.S. Cl. 321—5                                3 Claims

ABSTRACT OF THE DISCLOSURE

A solid state rectifier for successively connecting an electrical load to various conductors from a three phase AC supply to effect full wave rectification while limiting the maximum load voltage to line-to-neutral potentials. Commutation is controlled by logical relationships derived from the time phase characteristics of the three-phase voltage.

BACKGROUND OF THE INVENTION

All known full wave rectifiers in the prior art for use with three-phase electrical systems utilize transformers or other circuitry which produces full line-to-line voltage across the load.

If solid state components are used, severe problems are created by the line-to-line voltages since high peak inverse voltages are present that can damage the solid state components.

SUMMARY OF THE INVENTION

The present invention embodies provisions to successively connect a load to various pairs of conductors from a three-phase AC supply to effect full wave rectification while limiting the maximum load voltage at line-to-neutral potentials. Full wave rectification without the use of power transformers is obtained and positive control of turn-off as well as turn-on of conduction time for each phase is achieved.

Thus, it is an object of the present invention to provide a solid state, three-phase, full wave rectifier.

It is a further object of the present invention to provide a solid state, three-phase, full wave rectifier which maintains maximum load voltage at line-to-neutral potential rather than at line-to-line potential.

It is still a further object of the present invention to provide solid state commutation of current providing phases controlled by logical relationships derived from the time phase characteristics of the three-phase voltage.

BRIEF DESCRIPTION OF THE DRAWINGS

These and other more detailed and specific objects will be disclosed in the course of the following specification, reference being had to the accompanying drawings, in which.

DESCRIPTION OF THE PREFERRED EMBODIMENT

Figure 1:
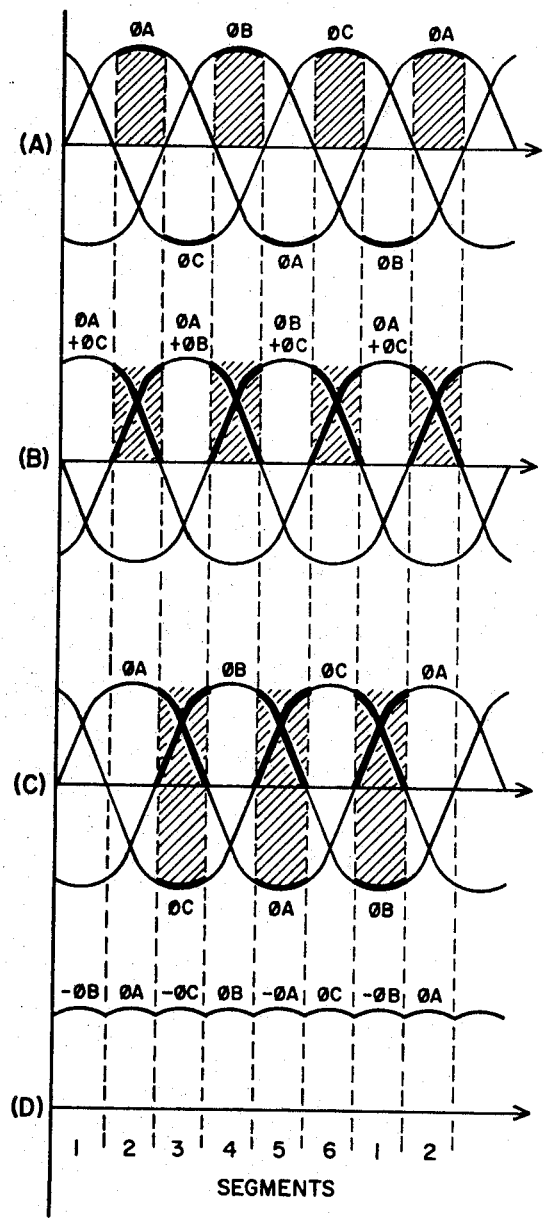
FIG. 1(a), (b), (c) and (d) are graphs disclosing the time relationships of the three-phase voltage, the combinations of these phases which are used to determine switching conditions and the phase segments which are connected to the load in one cycle.

As shown in FIG. 1(a), (b) and (c), the time relationships of the three phases and combinations of these phases are used to determine switching conditions which will connect various conduction path arrangements to the load. It will be seen that one full cycle of the three-phase AC source is divided into six separate segments. The absolute magnitude of the segments of the phases that are connected to the load are shown in FIG. 1(d). Switching between conduction paths occurs in accordance with the following logical relationships:

TABLE I

| Segment | Phase Connected To Load | Switching Control Signals |
| --- | --- | --- |
| 2 | $\phi A$ during the positive ½ cycle. | $(+\phi A+\phi B)$ and $(+\phi A+\phi C)$. |
| 3 | $\phi C$ during the negative ½ cycle. | $(+\phi A$ and $+\phi B)$. |
| 4 | $\phi B$ during the positive ½ cycle. | $(+\phi A+\phi B)$ and $(+\phi B+\phi C)$. |
| 5 | $\phi A$ during the negative ½ cycle. | $(+\phi B$ and $+\phi C)$. |
| 6 | $\phi C$ during the psoitive ½ cycle. | $(+\phi A+\phi C)$ and $(+\phi B+\phi C)$. |
| 1 | $\phi B$ during the negative ½ cycle. | $(+\phi A$ and $+\phi C)$. |

Thus, referring to FIG. 1(a) and (b) and considering segment 2 or $\phi A$ shown in FIG. 1(d), it will be seen that current is to be conducted from $\phi A$ during its positive half cycle. This time interval is shown by the appropriately labeled shaded portion in FIG. 1(a). In order to obtain conditions which are unique and sufficient to connect the load between this phase and neutral during the time interval indicated, the control signals shown in the corresponding shaded portion in FIG. 1(b) are used. Thus, $\phi A+\phi B$ and $\phi A+\phi C$ are combined. When each of the phases in the combination are positive, the condition is such that $+\phi A$ is connected to the load for the portion of the positive half cycle shown in FIG. 1(a). This gives a 60° segment when the load is connected between $+\phi A$ and neutral.

Considering segment 3 or $-\phi C$, it will be seen that current is to be conducted from $\phi C$ during its negative half cycle. This time interval is shown by the appropriately labeled shaded portion in FIG. 1(c). In order to obtain conditions which are unique and sufficient to connect the load between this phase and neutral during the time interval indicated, the control signals shown in the corresponding shaded portion in the upper half of FIG. 1(c) are used. Thus $\phi A$ and $\phi B$ are utilized and when both of these phases are positive, the condition is such that $\phi C$ is connected to the load for the portion of the negative half cycle shown in FIG. 1(c). This gives a second 60° segment when the load is connected between $-\phi C$ and neutral.

In a similar manner, considering segment 4 or $\phi B$, it will be seen that current is to be conducted from $\phi B$ during its positive half cycle. This time interval is shown by the appropriately labeled shaded portion shown in FIG. 1(a). In order to obtain conditions which are unique and sufficient to connect the load between this phase and neutral during the time interval indicated, the control signals shown in the corresponding shaded portion in FIG. 1(b) are used. Thus, $\phi A+\phi B$ and $\phi B+\phi C$ are combined. When each of the phases in the combination are positive, the condition is such that $\phi B$ is connected to the load for the portion of the positive half cycle shown in FIG. 1(a). This gives a third 60° segment when the load is connected between $+\phi B$ and neutral.

The remaining segments, 5, 6 and 1, are treated in a similar manner as shown in FIG. 1(a), (b) and (c) for the other phases.

The required conditions for switching in each case are met by the circuits to be described in the following pages with reference to FIG. 2, FIG. 3 and FIG. 4. Combinations of the phases are summed at the input to the circuits to yield a logical AND condition so that a proper decision may be made at the proper time.

Figure 2:
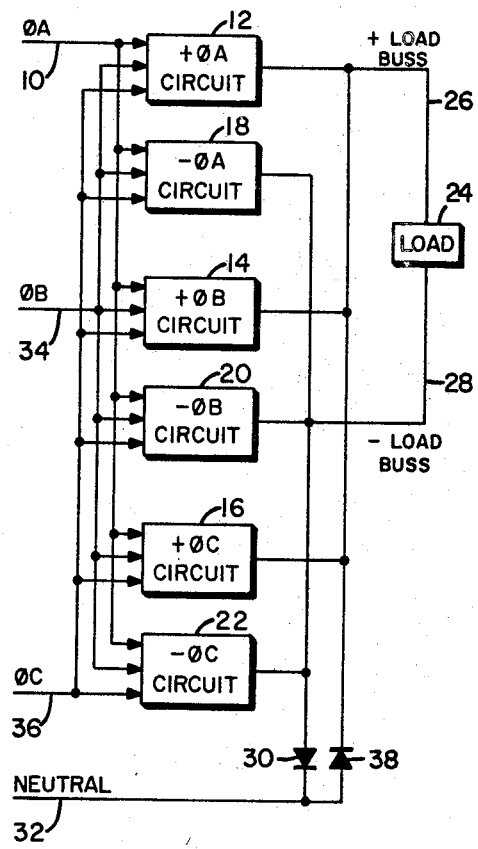
FIG. 2 generally illustrates the present invention in block diagram form for three-phase rectification without a primary power transformer.
Figure 3:
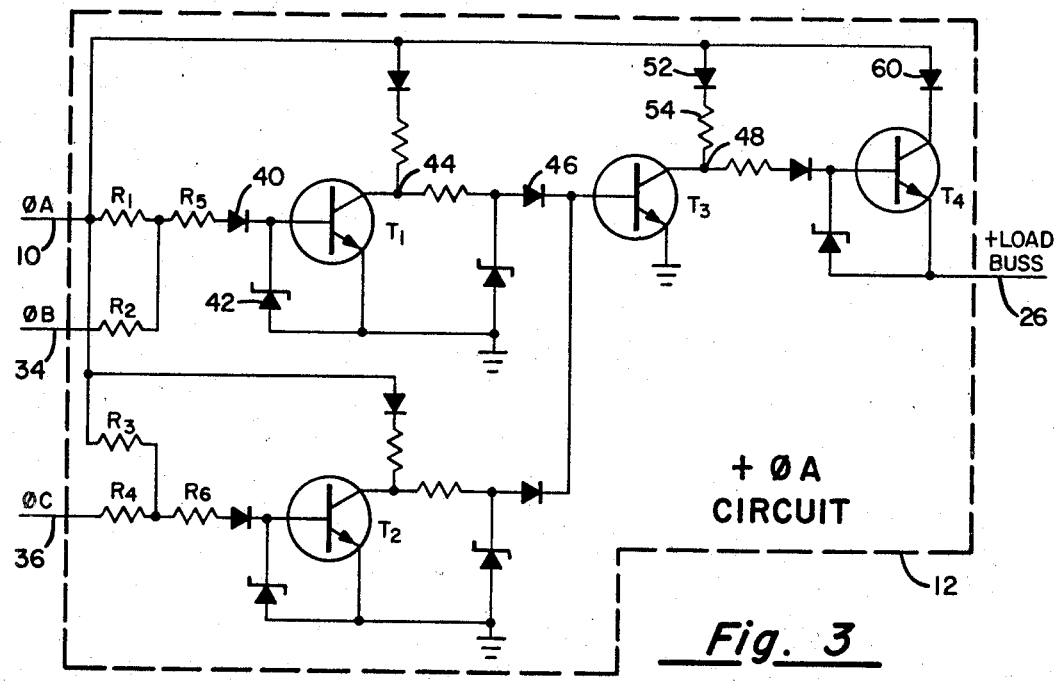
FIG. 3 is a circuit diagram which shows how the load could be coupled to one of the phase lines during a positive ⅙ of a cycle.

FIG. 2 generally illustrates the present invention in block diagram for utilizing solid state circuits for three-phase rectification without a primary power transformer. It comprises, in a sense, six switches used in a bridge configuration. Three of these switches operate on the three positive phases and the other three switches operate on the negative phases. The $+\phi A$, $+\phi B$ and $+\phi C$ circuits, shown as blocks 12, 14 and 16 respectively in FIG. 2, are the same in construction and differ only in the phases that are applied to the individual conductors. The $-\phi A$, $-\phi B$ and $-\phi C$ circuits, shown as blocks 18, 20 and 22 respectively in FIG. 2, are also the same in construction and, again, differ only in the phases that are applied to the individual conductors. Current flow, in each case, is coupled to the load from a particular phase at a particular time in accordance with the above logical relationships and the load 24 remains connected between that phase and neutral during a 60° time interval.

For example, in the case of the $+\phi A$ switch 12, current flows from the $\phi A$ input line 10 to the $+\phi A$ switch 12, through circuit 12 to the load 24 via positive buss 26 and back through negative buss 28 and diode 30 to neutral line 32 where the current is returned to the source. Note that input leads 10, 34 and 36 for $\phi A$, $\phi B$ and $\phi C$ respectively and neutral lead 32 form a 4-wire, three-phase source.

Since the inputs are sine wave inputs, therefore operating both positively and negatively, and it is desired to commutate between two of these three phases every 60° to give six separate commutations per cycle, it will be necessary to switch from one phase to another at a very appropriate time so that only one phase is connected across the load at a particular time. The order in which the commutation between the phases occurs can be seen in FIG. 1(d). The $+\phi A$ is first connected to the load 24 and current flows from the switch 12 to the load 24 via positive load buss 26 and then to the neutral line 32 via the negative load buss 28 and diode 30.

The $-\phi C$ switch 22 then closes at the time the $+\phi A$ switch 12 opens and current now flows from the neutral line 32 through the diode 38, positive load buss 26, load 24, negative load buss 28 and the $-\phi C$ switch 22.

The $+\phi B$ switch 14 then closes at the time that the $-\phi C$ switch 22 opens and the current then follows the same path from switch 14 as that described for the $+\phi A$ switch 12.

The $-\phi A$ switch 18 then closes at the time that the $+\phi B$ switch 14 opens and the current then follows the same path from switch 18 as that described for the $-\phi C$ switch 22.

The $+\phi C$ switch 16 then closes at the time that the $-\phi A$ switch 18 opens and the current then follows the same path from switch 16 as that described for either the $+\phi A$ switch 12 or the $+\phi C$ switch 16.

The $-\phi B$ switch 20 then closes at the time that the $+\phi C$ switch 16 opens and the current then follows the same path from switch 20 as that described for either the $-\phi A$ switch 18 or the $-\phi C$ switch 22.

It will be noted that the phases have been combined such that only positive triggering voltages are used to enable the switches. Thus, to couple the $-\phi C$ voltage to the load, the triggering voltages used are $+\phi A$ and $+\phi B$. Likewise, the triggering voltages for $-\phi B$ are $+\phi C$ and $+\phi A$ while the triggering voltages for $-\phi A$ are $+\phi B$ and $+\phi C$. It can be seen from FIG. 1(a) and (b) that the triggering voltages for $-\phi C$ could be $(\phi A+\phi C)$ and $(\phi B+\phi C)$.

In like manner, it will be noted in FIG. 1(a) and 1(b) that the triggering voltages for $+\phi A$ are $(\phi A+\phi B)$ and $(\phi A+\phi C)$ but it is also obvious that $-\phi B$ and $-\phi C$ could be used. However, in either of the above cases, the circuits must be so designed that if any phase should drop out, no two switches can conduct at the same time.

Thus, during ⅙ of a cycle, the positive load buss is connected to receive a positive voltage from a positive phase while the negative load buss is clamped to the neutral line by diode 30. During the next ⅙ cycle, the negative load buss is connected to receive a negative voltage of whatever phase happens to be coming up next while the positive buss is clamped to the neutral line by diode 38. This alternating operation continues for the remaining ⅘ cycle.

It will be remembered that the conditions which are intended for phase conduction from $\phi A$ are $(\phi A+\phi B)$ and $(\phi A+\phi C)$. FIG. 3 illustrates a circuit which can be used to connect $+\phi A$ to the load for the specified conditions. Resistors $R_1$, $R_2$ and $R_5$ form a network which will effectively sum the voltages of the phases $+\phi A$ and $+\phi B$ which are connected as inputs thereto. Isolation diode 40 couples the voltage sum to the base of transistor $T_1$. Zener diode 42 limits the positive and negative swings of the voltage sum in order to protect transistor $T_1$. If both of the input voltages, $+\phi A$ and $+\phi B$, are positive, transistor $T_1$ is turned on and the collector 44 goes essentially to ground potential. This means that there will be no output signal from transistor $T_1$ coupled through isolation diode 46 to the base of transistor $T_3$. Transistor $T_3$ will conduct if it receives an output from either of the transistors $T_1$ and $T_2$. Thus, transistor $T_2$ must also be conducting if transistor $T_3$ is to be shut off. Since the input circuit to transistor $T_2$ functions in an exact manner as that described for the input circuit to transistor $T_1$, it will be seen that both $\phi A+\phi B$ and $\phi A+\phi C$ must be positive before both transistors $T_1$ and $T_2$ will be conducting and, therefore, transistor $T_3$ will be shut off.

Assuming that all inputs are positive, transistors $T_1$ and $T_2$ are conducting and transistor $T_3$ is shut off, it will be seen that the collector 48 of transistor $T_3$ will receive the full potential of $\phi A$ on line 10 through isolation diode 52 and resistor 54. This potential is then coupled to the base of transistor $T_4$ which causes it to conduct. Since the load is connected to the emitter of transistor $T_4$ on positive load buss 26, it is obvious that with transistor $T_4$ conducting the $+\phi A$ voltage on line 10 will be coupled through diode 60 and transistor $T_4$ to the load. This situation continues for ⅙ of a cycle at which time the input conditions are no longer met, i.e., the sum $(\phi A+\phi B)$ or $(\phi A+\phi C)$ is no longer positive. At that time, either transistor $T_1$ or $T_2$ is turned off which, in turn, causes transistor $T_3$ to conduct. The output of transistor $T_3$ on collector 48 is at ground potential which causes transistor $T_4$ to be turned off and, thus, remove $+\phi A$ from the load.

As stated previously, the circuits for $+\phi B$ and $+\phi C$ are identical except for the input connections which must be as shown in Table I for segments 4 and 6.

Figure 4:
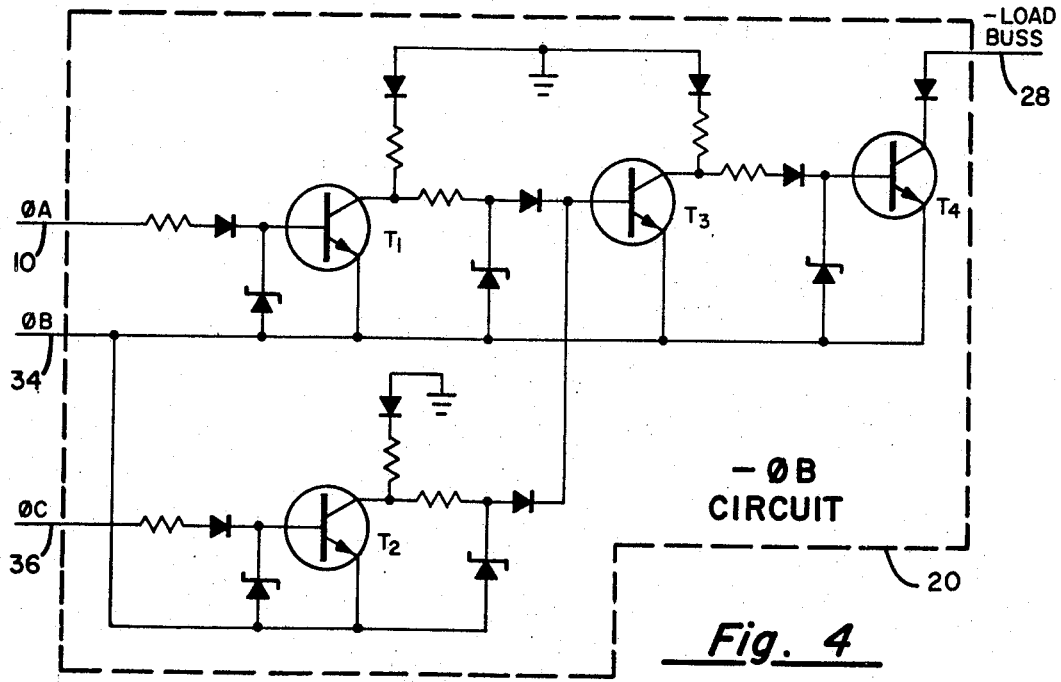
FIG. 4 is a circuit diagram which shows how the load could be coupled to one of the phase lines during a negative ⅙ of a cycle.

FIG. 4 illustrates a circuit for connecting a negative phase 30 voltage to the load. More specifically, it is a circuit for connecting the $-\phi B$ voltage to the load. The circuit functions in a manner similar to that shown in FIG. 3 except that the positive load buss is now clamped to the neutral as shown in FIG. 2. Thus, the circuit in FIG. 4 couples a negative voltage to the negative voltage buss. This can happen only when transistor $T_4$ is conducting and this transistor can conduct only if transistor $T_3$ is not conducting. Transistor $T_3$ will be in the non-conducting state only when both transistors $T_1$ and $T_2$ are in the conducting state. As shown for segment 1 in Table I, when $\phi B$ is negative, both of the control signals, $\phi A$ and $\phi C$, must be positive. This is the condition necessary for the connection of $-\phi B$ to the negative load buss during the 60° period in which it is desired to draw current out of $\phi B$.

The only time then that transistors $T_1$ and $T_2$ will be turned on is when $\phi A$ and $\phi C$ are positive and $\phi B$ is negative. At that time, with $-\phi B$ present on the collectors of both transistors $T_1$ and $T_2$, a negative signal is present to be coupled to the base of transistor $T_3$. Thus, transistor $T_3$ is turned off which couples a positive ground potential to the base of transistor $T_4$ and turns it on. Thus, the negative $\phi B$ on line 34 is coupled through transistor $T_4$ and diode 62 to the negative load buss 28.

As stated previously, the circuits for the $-\phi A$ and $-\phi C$ are identical except for the input connections which must be as shown in Table I for segments 3 and 5.

Obviously, filtering can be accomplished with the use of conventional filtering circuits coupled to the positive and negative load busses.

Thus, applicant has disclosed a solid state rectifier for successively connecting an electrical load to various conductors for a three-phase AC supply to effect full wave rectification while limiting the maximum load voltage to line-to-neutral potentials.

I claim:
1. A full wave rectifier for three-phase alternating current wherein the three-phase system includes a neutral line and three-phase lines, said rectifier comprising:
   (a) a positive and a negative load buss to be connected to a load;
   (b) three pairs of switches, each of said pair of switches having the output of one of said pair adapted to be connected to said positive load buss and the output of the other of said pair adapted to be connected to said negative load buss and each of said pair of switches having a different one of said three-phase lines directly connected thereto as an input;
   (c) first switch closing means coupled to a first three of said switches for closing an individual switch only when the other two phases not connected thereto are both of a first polarity whereby each of said first three switches is closed for substantially one-sixth of a phase cycle and connects a selected portion of the phase on the input line which is of the opposite polarity to the load buss of that polarity;
   (d) second switch closing means coupled to the second three of said switches for closing a switch only when the other two phases are of said opposite polarity whereby each of said second three switches is closed for substantially one-sixth of a phase cycle and connects a selected portion of the phase on the input line which is of said first polarity to the load buss of like polarity; and
   (e) means coupled to said neutral line and to said positive and negative busses for selectively coupling the de-energized buss to said neutral line whereby the current always flows through the load in the same direction to the neutral line.

2. A rectifier as in claim 1 wherein said first and second switch closing means comprises:
   (a) an AND circuit having input terminals for receiving said other two phases and producing a switch closing signal when said other two phases are of the proper polarity.

3. A rectifier as in claim 1 wherein said means for coupling the de-energized buss to said neutral line comprises:
   (a) a first diode having first and second electrodes with the first electrode coupled to said neutral line and the second electrode coupled to said positive buss, and
   (b) a second diode with its second electrode coupled to said negative buss and its first electrode coupled to said neutral line.

References Cited
UNITED STATES PATENTS

| | | | |
|---|---|---|---|
| 1,712,502 | 5/1929 | Jonas | 321—5 |
| 1,712,569 | 5/1929 | Kuebler | 321—5 |
| 3,134,068 | 5/1964 | Feltman | 321—5 X |
| 3,170,107 | 2/1965 | Jessee | 321—7 |
| 3,329,883 | 7/1967 | Frierdich | 321—5 |
| 3,337,788 | 8/1967 | Pelly | 321—7 |

LEE T. HIX, Primary Examiner
W. H. BEHA, Jr., Assistant Examiner

U.S. Cl. X.R.
321—47